(12) United States Patent
Chen et al.

(10) Patent No.: US 8,371,007 B2
(45) Date of Patent: Feb. 12, 2013

(54) DRAIN APPARATUS

(75) Inventors: Lien-Yan Chen, Spring, TX (US);
James Michael Storey, Houston, TX (US); Robert Henri Gauthier, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/113,013

(22) Filed: May 20, 2011

(65) Prior Publication Data
US 2012/0291246 A1 Nov. 22, 2012

(51) Int. Cl.
*B25B 27/14* (2006.01)

(52) U.S. Cl. ............... 29/278; 29/270; 29/244

(58) Field of Classification Search ........... 29/278, 29/270, 244, 274, 243.5
See application file for complete search history.

(56) References Cited

U.S. PATENT DOCUMENTS

| | | | | |
|---|---|---|---|---|
| 3,349,512 A | * | 10/1967 | Walker | 43/26 |
| 4,029,105 A | * | 6/1977 | Faust | 128/207.17 |
| 4,409,867 A | * | 10/1983 | Lyden | 81/436 |
| 5,499,557 A | | 3/1996 | Fry | |
| 6,198,049 B1 | * | 3/2001 | Korinek | 174/87 |
| 7,159,491 B1 | * | 1/2007 | Chaconas et al. | 81/58.1 |
| 7,484,711 B2 | * | 2/2009 | Pyron | 254/134.3 FT |
| 2003/0033910 A1 | * | 2/2003 | Goacher, Sr. | 81/124.2 |
| 2010/0029991 A1 | | 2/2010 | Dahmen et al. | |
| 2012/0060953 A1 | * | 3/2012 | Trent et al. | 137/597 |

FOREIGN PATENT DOCUMENTS

| | | |
|---|---|---|
| EP | 2455443 A1 | 5/2012 |
| KR | 20080024797 A | 3/2008 |
| PL | 12919 B1 | 1/1931 |
| PL | 109666 B1 | 7/1978 |
| PL | 193114 B1 | 12/2002 |

OTHER PUBLICATIONS

PL Search Report dated Jun. 4, 2012 from corresponding PL Application No. P-399241.

* cited by examiner

*Primary Examiner* — Lee D Wilson
(74) *Attorney, Agent, or Firm* — Fletcher Yoder, P.C.

(57) ABSTRACT

In one embodiment, a system is provided, including a plug removal shield. The plug removal shield further includes a tube configured to surround a plug retaining a fluid volume, and a mount configured to hold the tube relative to the plug. The tube includes a port configured to pass a plug removal tool into proximity with the plug.

16 Claims, 6 Drawing Sheets

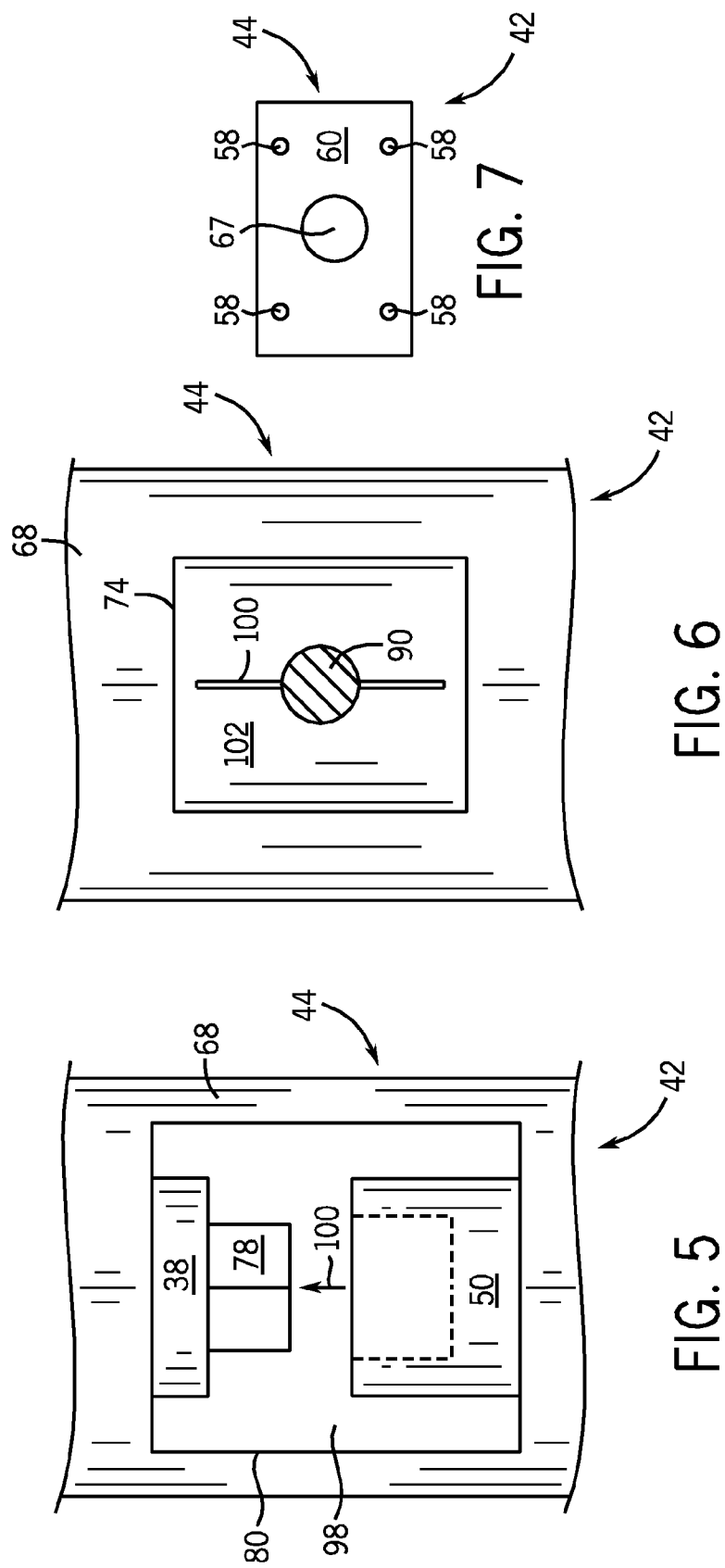

DRAIN APPARATUS

BACKGROUND OF THE INVENTION

The subject matter disclosed herein relates to drain tools, and more specifically, to tools used in draining fluids from chambers and/or conduits.

Various fluid systems include conduits and/or chambers used to store and deliver a variety of fluids. For example, gasification systems may include a plurality of pipes useful for heat transfer, such as the pipes included in a syngas cooler. The fluid may need to be removed and/or replaced for maintenance, cold weather conditions, or a variety of other reasons. Unfortunately, the fluid may be under pressure, thereby complicating and increasing the time required to drain the fluid.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a plug removal shield. The plug removal shield further includes a tube configured to surround a plug retaining a fluid volume, and a mount configured to hold the tube relative to the plug. The tube includes a port configured to pass a plug removal tool into proximity with the plug.

In a second embodiment, a system includes a plug removal kit. The plug removal kit further includes a plug removal tool configured to remove a plug retaining a fluid volume. The plug removal kit additionally includes a plug removal shield. The plug removal shield includes a mount configured to hold the plug removal shield relative to the plug. The plug removal shield is configured to shield an operator of the plug removal tool from fluid drainage after removal of the plug by the plug removal tool.

In a third embodiment, a system includes a fitting removal kit. The fitting removal kit further includes a fitting removal shield. The fitting removal shield comprises a tube configured to surround a threaded fitting coupled to a fluid-based system. The tube includes a tube port. The fitting removal tool also includes a shaft extending through the tool port in the tube, a handle disposed external to the tube, and a head disposed inside the tube.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a side view illustrating an embodiment of a viewing window taken along line 5-5 of FIG. 4;

FIG. 6 is a side view illustrating an embodiment of a tool port taken along line 6-6 of FIG. 4;

FIG. 7 is a top view illustrating an embodiment of a flange taken along line 7-7 of FIG. 4;

DETAILED DESCRIPTION OF THE INVENTION

Figure 1:
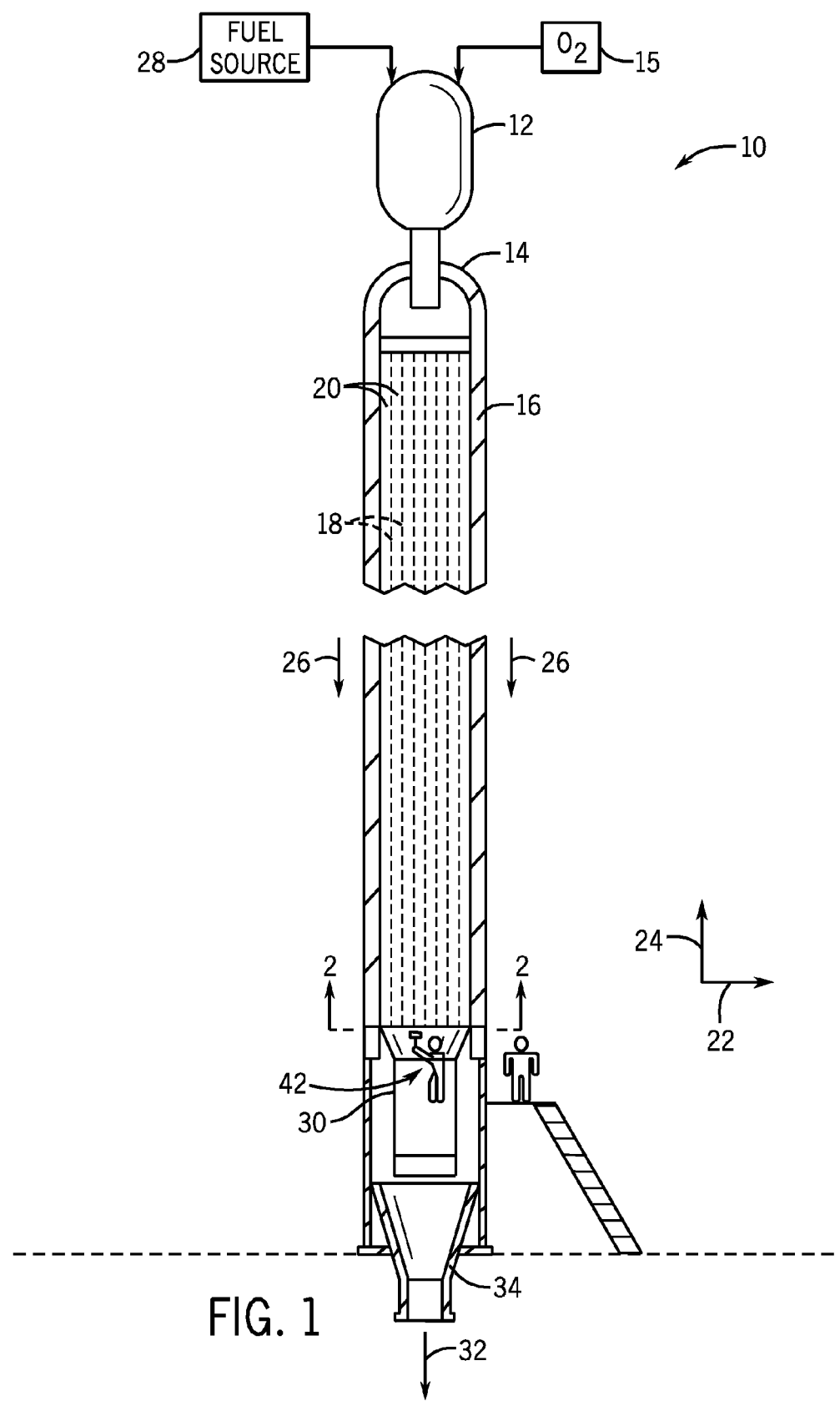
FIG. 1 is a schematic cross-section side view illustrating an embodiment of a gasification system having a syngas cooler coupled to a gasifier.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A variety of fluid systems include fluid chambers and/or fluid conduits, which may occasionally require drainage. For example, various heat exchangers, boilers, combustion systems, and reactors may include fluid chambers and/or conduits that carry high temperature and/or high pressure fluids. In particular, gasification systems include coolant systems, which remove heat associated with production of syngas. A gasification system may convert a carbonaceous fuel, such as coal, into a fuel such as syngas. A gasifier may include a radiant syngas cooler (RSC) having a plurality of platens (e.g., chambers) and fluid conduits (e.g., pipes). The platens, along with a plurality of fluid conduits, may be used as a heat exchanger to absorb heat from a hot syngas path and convert the fluid from a liquid phase into a gas phase (e.g., steam). The recovered heat may be used to improve thermal efficiency of a gasification plant, for example, by driving a steam turbine. In some cases, the platens may include longitudinal lengths of approximately 5 to 15 meters, 10 to 20 meters, 10 to 30 meters, a width of approximately 0.5, to 5 meters, 1 to 10 meters wide and a depth of approximately 5 to 10 centimeters, 5 to 40 centimeters. The platens may be filled with a fluid, such as a liquid (e.g., water), useful in heat exchange operations. Accordingly, a large fluid column may be contained inside each platen.

In certain circumstances, such as during maintenance operations of the gasifier, it may be desirable to drain the fluid columns inside the platens. Accordingly, the platens may include a draining mechanism, such as a drain conduit or drain tube, having a drain plug useful in evacuating the water column. For example, the drain plug may be removed, and the water column may be allowed to evacuate through the drain tube, aided by gravity. However, the size of the water column may result in the water exiting the drain plug at high pressures (e.g., approximately 2 to 5 bar, 4 to 10 bar, 2 to 15 bar). Accordingly, the present embodiments include tools and techniques useful in draining fluids, including fluids at higher pressures. Further, the present embodiments may be used to evacuate or drain fluids that may include hazardous substances, such as flammable fluids, acids, oxidizers, and so forth. Additionally, the embodiments disclosed herein are suitable for the evacuation of high temperature fluids (e.g., approximately upwards of 50° C.). Moreover, the present embodiments enable the drainage of fluids from difficult to access locations, such as locations under piping or fluid conduits.

In certain embodiments, a drain plug or fitting removal kit is provided that includes a plug or fitting removal tool and a plug or fitting removal shield. The plug or fitting removal tool may include a nut removal tool, such as a ratchet or socket wrench, pliers, and the like, suitable for removing the drainage plug or a threaded fitting. The plug removal shield may include a tube useful in surrounding the plug and in capturing the fluid draining from the plug. Indeed, the plug removal shield may redirect the draining fluid while shielding an operator from exposure to the fluid. A hose may be coupled to the plug removal shield's tube, so as to redirect the drained fluid into a suitable storage location or drainage conduit (e.g., sewer system). The plug removal shield may further include a mount suitable for mounting or otherwise securing the plug removal shield in place. In certain embodiments, the mount may include a flexible mount, such as a chain, cable, or strap made of metal, fabric, plastic, or any combination thereof. The flexible mount may be disposed circumferentially around a pipe or tube, such as the RSC's drain tube, thus securing the mount to the drain tube. In other embodiments, the mount may include a non-flexible mount, such as a rigid U-clamp, a bent rod, a square rod, or other similar device suitable for securing the plug removal shield to the drain tube. In this way, the plug removal shield may be securely attached to a variety of locations, even locations that may be otherwise difficult to access.

The plug removal shield's tube may further include an opening or slot suitable for enabling the entry of the plug removal tool into the tube. The opening may be advantageously sealed by a grommet (e.g., a resilient seal with at least one opening or slit), useful in minimizing or eliminating leakage of the drained fluid. In certain embodiments, the plug removal shield's tube may be manufactured out of a transparent or translucent material that enables a view of the drain plug, useful in positioning the plug removal and removing the drain plug by using the plug removal tool. In other embodiments, the plug removal shield's tube may include one or more transparent or translucent viewing windows that enable a view into the tube, useful in removing the drain plug. In another embodiment, the plug removal shield's tube may be manufactured out of a non-transparent or non-translucent material.

The operator may mount the plug removal shield so that the plug removal shield's tube is disposed, for example, under the drain plug. The operator may then insert the plug removal tool into the plug removal shield's tube, engage the drain plug, and remove the drain plug. The drained fluid may then flow through the plug removal shield's tube, and be redirected by the hose into a containment vessel or a drainage conduit. Indeed, the operator need not come in contact with the fluid, thus enabling for a safer, more efficient drainage of fluid, including hazardous material (i.e., hazmat) fluids, and high temperature fluids. Further, plug removal shield, including mount, tube, and attached hose, enable drainage of higher pressure flows, including pressures upwards of 15 bar.

FIG. 1 is a schematic cross-section side view of an embodiment of gasification system 10, including a gasifier 12 and a syngas cooler 14, such as a radiant syngas cooler (RSC). The figure further illustrates a user with a plug or fitting removal kit 42, the kit 42 further described below with respect to FIGS. 3 and 4. The gasification system 10 may be included in a gasification plant and/or power plant, such as an integrated gasification combined cycle (IGCC) plant. The gasification system 10 may partially oxidize a carbonaceous fuel, such as coal, biomass, and the like, and convert the fuel into a synthetic gas (i.e., syngas). For example, the gasifier 12 may subject the fuel to a controlled amount of any moderator and limited oxygen 15 at elevated pressures (e.g., from approximately 40 bar-90 bar) and elevated temperatures (e.g., approximately 1200° C.-1500° C.), depending on the type of fuel used. The resulting partial oxidation reaction may convert the fuel into the syngas, e.g., a combination of carbon monoxide and hydrogen.

The gasification system 10 may include the depicted RSC 14, useful in heat exchange operations. As mentioned above, the gasifier 12 may be operating at temperatures of approximately between 1200° C.-1500° C. Accordingly, the RSC 14 may be useful in cooling the syngas prior to transmission of the syngas to other processes (e.g., water-gas shift reaction). Moreover, the RSC 14 may also be useful in separating a slag from the syngas. The RSC 14 may also include a vessel 16. The vessel 16 may act as an enclosure for the RSC 14. The vessel 16 may also house cooling tubing 18 and platens 20. The cooling tubing 18 may include a plurality of conduits extending parallel with the vessel 16 relative to the axial axis 24, and spaced side by side relative to a radial axis 22. A coolant, such as water or another liquid, may flow through the tubing 18 and/or platens 20. Thus, the tubing 18 and/or platens 20 may act as a heat exchanger within the RSC 14, and may circulate the coolant for removal of heat, for example, from syngas and slag. The syngas generated in the gasifier 10 may generally flow in a downward manner parallel to the tubing 18 as indicated by arrows 26. In operation, fuel from a fuel source 28 may be mixed with the oxygen 15 and partially oxidized by the gasifier 12 to generate syngas.

The generated syngas may engage the tubing 18 and/or platens 20 of the RSC 14, with the coolant flowing through the tubing 18 and/or platens 20, thereby cooling the syngas as it travels through the RSC 14. One result of this cooling process may be the generation of steam in the tubing 18, which may then be transmitted from the RSC 14, for example, for further use by a steam turbine. The RSC 14 may also include a conduit 30 that may aid in directing the slag out of the RSC 14. For example, as the slag exits the conduit 30, the slag may flow in a generally downward direction 32 to exit the RSC 14 via a RSC bottom cone 34 containing water to cool the slag. In this, way, the RSC 14 may aid in cooling the syngas and in separating slag from the syngas. During maintenance operations, it may be beneficial to drain the RSC 14. Accordingly, the platens 20 and tubing 18 may include one or more drain tubes and drain plugs, as described below with respect to FIG. 2.

Figure 2:
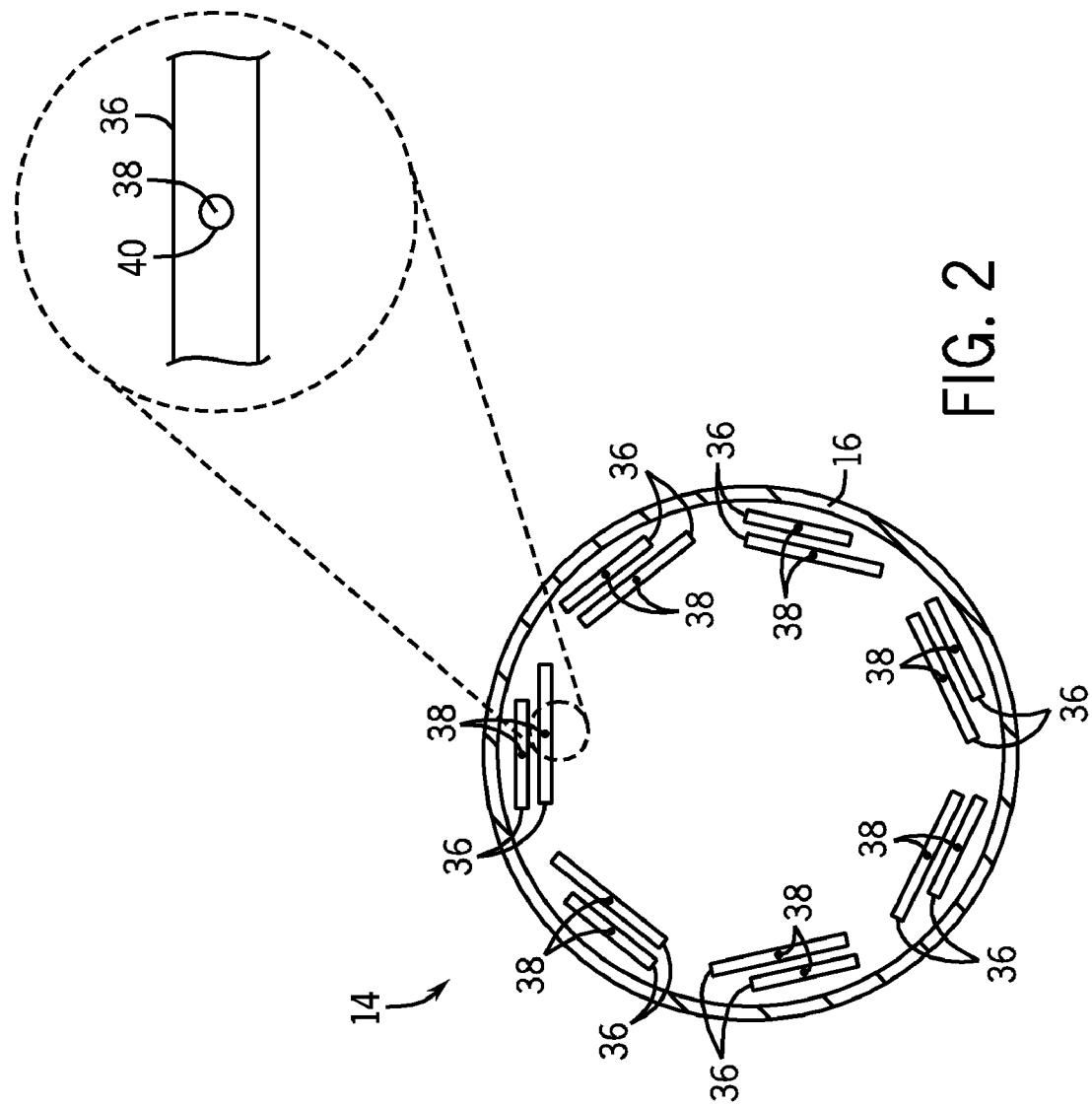
FIG. 2 is a schematic cross-section bottom view illustrating an embodiment of the syngas cooler of FIG. 1 taken along line 2-2.

FIG. 2 is a cross-section bottom view of an embodiment of multiple drain tubes 36 and drain plugs 38 of the RSC 14, useful in draining the platens 20 and tubing 18 shown in FIG. 1. The drain tubes 36 may be fluidly connected to the platens 20 and tubing 18, and may encircle the vessel 16 of the RSC 14. Accordingly, the removal of the drain plugs 38 may enable the draining of fluid inside of the platens 20 and tubing 18, for example, by gravity. In one embodiment, the drain plug 38 may be a threaded drain plug 38 suitable for securely occluding or blocking a drain hole 40. Removal of the drain plug 38 may thus result in the fluid columns contained inside the platens 20 and tubes 18 to drain out through the drain hole 40. However, the size of the water columns may result in the water exiting the drain hole 40 at high pressures (e.g., approximately 2 to 15 bar). Accordingly, a plug removal or fitting removal kit is provided that may enable the drainage of the high pressure water columns, hazardous fluids, and/or high temperature fluids, as described in more detail below with respect to FIG. 3.

Figure 3:
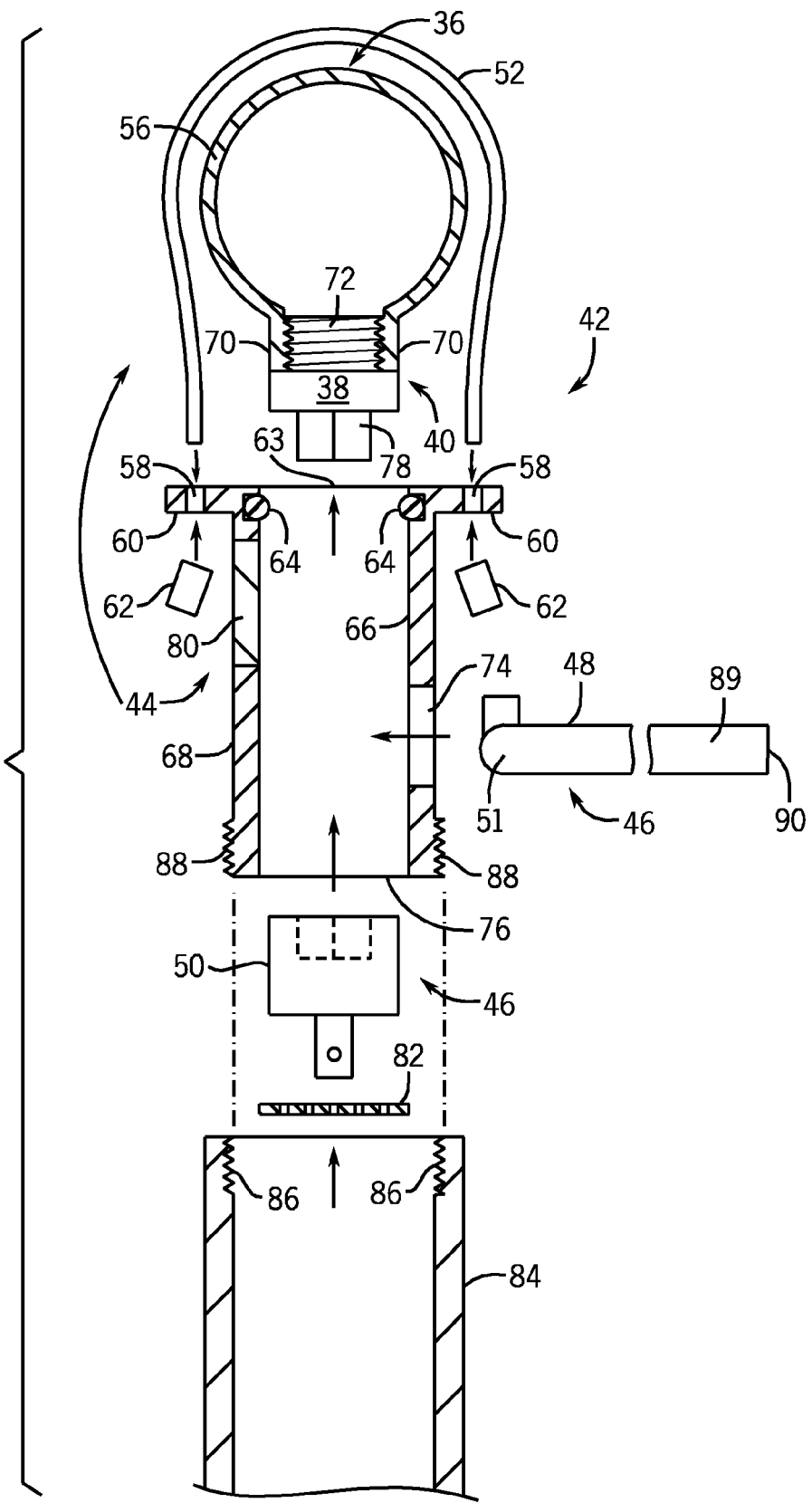
FIG. 3 is a schematic cross-section side view illustrating an embodiment of a drain plug removal kit for the syngas cooler of FIG. 1.

FIG. 3 is a schematic cross-section side view illustrating an embodiment of a drain plug or fitting removal kit 42 and the drain tube 36. In the illustrated embodiment, the plug removal kit 42 includes a plug or fitting removal shield 44 and a plug or fitting removal tool 46. The plug removal tool 46 includes a ratchet or socket wrench 48 and a socket 50, such as a magnetic socket 50. The ratchet wrench 48 further includes a head 51 that may be used to couple the socket 50 to the ratchet wrench 48. The plug removal shield 44 may also include a mount 52 suitable for mounting the plug removal shield 44 onto the drain tube 36 having the drain plug 38, such as a hexagonal bolt drain plug 38. In certain embodiments, the mount 52 is a flexible mount 52, such as a metal, plastic, or fabric strap (e.g., a rope, a chain, a wire, a cable, a metal tape, a Velcro™ strap, a plastic tie, and so forth). Accordingly, the mount 52 may be more easily positioned around walls 56 of the tube 36, as illustrated. In other embodiments, the mount 52 is a rigid mount, such as a U-clamp, a bent rod, a square rod, or other similar device suitable for attaching the plug removal shield 44 to the drain tube 36. It is to be understood that multiple mounts 52 may be used, for example, 2, 3, 4, 5, 6 mounts 52.

In the depicted embodiment, the flexible mount 52 may be positioned so as to circumferentially surround the wall 56 of the drain tube 36. The mount 52 may then be inserted through openings 58 in a flange 60 of the plug removal shield 44, and fastened to the plug removal shield 44 by using fasteners 62. The fasteners 62 may include stop or fastening sleeves, cable crimps, and the like, that may "slide" longitudinally onto the mount 52. The fasteners 62 may then be crimped or otherwise secured in place onto the mount 52. Once attached to the mount 52, the fasteners 62 may securely fasten the plug removal shield 44 to the drain tube 36. Indeed, the fasteners 62 may retain the plug removal shield 44 securely in place, thus enabling a flow of high pressure fluid to drain through the plug removal shield 44, while the plug removal shield 44 remains at approximately the same position relative to the drain hole 40. In other embodiments, the mount 52 may be fastened to bars rather than being inserted though the openings 58, as described in more detail in FIG. 8.

The plug removal shield 44 may further include an O-ring 64 disposed on a circumference of inner surface 66 of a shield tube 68, approximately near an opening 67 of the shield tube 68. The O-ring 64 may sealingly contact outside walls of a grooved protrusion 70 (e.g., annular protrusion) of the drain tube 36. In the depicted embodiment, the drain plug 38 is illustrated as occluding or otherwise blocking any fluid from draining through the grooved protrusion 70. Indeed, a threaded portion 72 of the drain plug 38 may be securely fastened to mating threads of the grooved protrusion 70 of the drain tube 36, so as securely fasten the drain plug 38 to the drain tube 36. In other embodiments, the grooved protrusion 70 may be disposed inside of the drain tube 36 rather than protruding externally from the drain tube 36. It is also to be noted that, in other embodiments, more than one O-ring 64 may be used.

The plug removal shield tube 68 may further include a port 74 suitable for enabling the insertion of the plug removal tool 46. The socket 50 included in the plug removal tool 46 may be inserted through the port 74, or through an opening 76 in the tube 68. The socket 50 may be suitably sized so as to engage a tool head (e.g., hexagonal head 78) of the drain plug 38 to enable removal of the drain plug 38. Indeed, the socket 58 may be used to unscrew or otherwise unfasten the drain plug 38 from the drain tube 36.

A viewing window 80 may also be provided, suitable for enabling a view of the drain plug 38 and the plug removal tool 46. Accordingly, an operator may more easily insert the socket 50 and socket wrench 48, and maneuver the socket 50 and the socket wrench 48 so as to engage the hexagonal head 78 of the drain plug 38. In the depicted embodiment, a mesh 82 may be included in the plug removal kit 42 and may be used to capture or otherwise catch the drain plug 38, for example, in circumstances where the socket 50 is non-magnetic, or in circumstances where the magnetic socket 50 undesirably drops the drain plug 38.

A hose 84 may be attached to the shield tube 68. In one embodiment, the hose 84 includes inner threads 86 suitable for interfacing with external threads 88 circumferentially disposed about the shield tube 68. Alternatively or additionally, the hose 84 may be further secured to the shield tube 68 by using a hose clamp, such as a worm-drive hose clamp depicted in FIG. 4. Once the hose 84 is secured to the shield tube 68, the ratchet wrench 48 may be used to remove the drain plug 38. In certain embodiments, the ratchet wrench 48 may be a powered wrench, such as a wrench using electric, pneumatic, or hydraulic power. In another embodiment, the ratchet wrench 48 may be manually powered. For example, the operator may use a handle 89 disposed on a shaft 90 of the ratchet wrench 48 to apply a manual force suitable in disengaging or otherwise removing the drain plug 38. The plug removal tool 46 (and magnetically attached drain plug 38), may then be removed, and fluid may drain through the drain opening 40, through the shield tube 68. The drained fluid may then be directed by the hose 84 into, for example, a storage tank or a drainage conduit.

Figure 4:
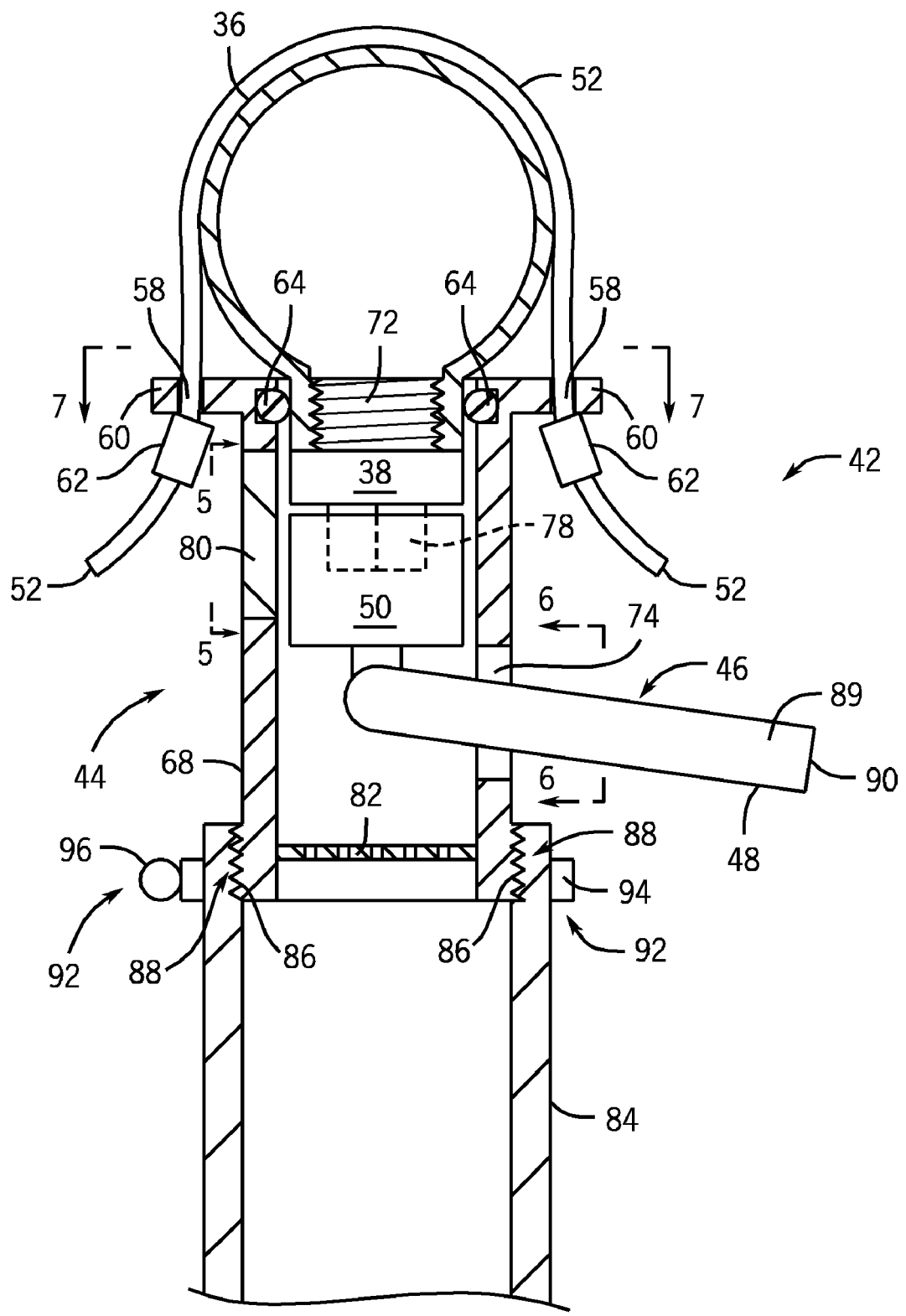
FIG. 4 is a schematic cross-section side view illustrating an embodiment of the drain plug removal kit of FIG. 3 attached to a drain tube.

FIG. 4 is a cross sectional side view illustrating an embodiment of the plug removal shield 42 fastened to the drain tube 38. Because the depicted FIG. 4 includes elements found in FIG. 3, these elements are denoted using like reference numbers. The depicted embodiment is also illustrative of the plug removal tool 46 fastened to the drain plug 38. As mentioned above, in one embodiment, the mount 52 may be inserted through the openings 58 of the flange 60. The mount 52 may then be securely fastened to the plug removal shield 44 by using the fasteners 62, such as fastening sleeves or cable crimps. The hose 84 is also depicted as securely fastened to the shield tube 68 by using the internal threads 86 and external threads 88, as well as by using a worm-drive hose clamp 92. The worm-drive hose clamp 92 may include a band 94 with a screw thread pattern cut or pressed into the band 94. One end of the band 94 may contain a captive or self-contained screw 96. Accordingly, turning the captive screw 96 may enable a secure tightening of the band 94 around, for example, the shield tube 68. It is to be noted that, in other embodiments, other hose clamps such as wire clamps, ear clamps, spring clamps, and the like, may be used additional or alternative to the worm drive hose clamp 92.

As illustrated, the viewing window 80 may be used by the operator to visualize the drain plug 38 and the plug removal tool 46. Indeed, the operator may insert the plug removal tool 46 through the port 74, and receive visual feedback to more quickly couple the plug removal tool 46 to the drain plug 38. The operator may then drive the wrench 48, for example, by using the handle 89, and subsequently remove the drain plug 38. By securely fastening the plug removal shield 44 to the drain tube 36, and by providing visual feedback of plug removal operations, the systems disclosed herein enable a more efficient and safer drainage of fluid.

FIG. 5 is a side view of an embodiment of the viewing window 80 included in the shield tube 68 of FIG. 4 taken within line 5-5. Indeed, the systems described herein may allow the operator to more easily receive feedback, such as visual feedback, of certain tasks, such as coupling the socket 50 to the drain plug 38. The viewing window 80 may include a transparent or translucent substrate 98 such as tempered glass, plastic, acrylic, mineral glass, synthetic sapphire, and the like, suitable for providing a transparent or translucent shield. In the depicted embodiment, the socket 50 is illustrated as moving in a direction 100 so as to engage the hexagonal portion 78 of the drain plug 38. The viewing window 80 enables the operator to visually ascertain a desired placement of the socket 50 onto the drain plug 38 prior to actuation of the socket wrench 48 shown in FIGS. 3 and 4. Once the desired placement is visually verified, the operator may drive the socket wrench 48 to remove the drain plug 38. It is to be noted that, in other embodiments, more viewing windows 80 may be included in the shield tube 68. In yet another embodiment, the viewing window 80 may be replaced with a transparent or translucent shield tube 68. That is, the tube 68 may be manufactured out of a transparent or translucent material suitable for visually inspecting the contents disposed inside the tube 68. In yet another embodiment, the tube 68 may be manufactured out of a material (e.g., stainless steel, titanium) that may completely occlude views of the interior of the tube 68.

FIG. 6 is a side view illustrating an embodiment of the port 74 and the shaft 90 of the wrench 48 of FIG. 4 taken along line 6-6. In the illustrated embodiment, the wrench 48 is positioned inside the tube 68 to engage the drain plug 38 shown in FIGS. 3-5. The port 74 may include a slot 100 in a substrate 102 to enable insertion of the wrench 48, while substantially shielding the operator from any fluid flowing through the port 74. That is, the slot 100 may minimize or eliminating any leaks exiting though the substrate 102 in the port 74, even when the shaft 90 is protruding from the slot 100, as illustrated. For example, the slot 100 may disposed approximately in the center of the substrate 102. In certain embodiments, the substrate 102 may be a rubber substrate, a neoprene substrate, a silicone substrate, or a plastic substrate. Accordingly, the substrate or wall 102 may include an elastic, resilient, or flexible property that enables the substrate 102 to be biased toward a closed position that substantially seals the slot 100, even when the shaft 90 protrudes through the slot 100. The slot 100 may be positioned approximately in the center of the substrate 102, as depicted, to more easily enable the insertion of the wrench 48 and/or socket 50. Once the wrench 48 is inserted, the substrate 102 may be biased inwardly to enclose the shaft 90 of the wrench 48, thus minimizing or eliminating leaks. Indeed, the substrate 102 embodiments described herein enable a more leak-proof and efficient draining of fluids. In another embodiment, a grommet or an eyelet (e.g., annular seal) may be used in lieu of the substrate 102 having a slot 100. For example, the grommet or eyelet may be manufactured out of rubber, neoprene, silicone, and/or plastic, and include a center opening having a size suitable for enabling the insertion of the wrench 48 and/or socket 50. In this way, the plug removal tool 46 may be used to quickly and safely remove the drain plug 38, while minimizing or eliminating leaks.

FIG. 7 is a bottom view illustrating an embodiment of the openings 58 and 67 positioned on the flange 60 of the plug removal shield 44 of FIG. 4 taken along line 7-7. As mentioned above with respect to FIGS. 3 and 4, the openings 58 may be used to insert the mounts 52 shown in FIGS. 3 and 4, such as a metal, plastic, or fabric strap, e.g., a rope, a chain, a wire, a cable, a metal tape, a Velcro strap, a plastic tie, a U-clamp, a bent rod, or a square rod suitable for securing the plug removal shield 44 to the drain tube 36. The opening 67 may be used to drain fluid. The mounts 52 may be circumferentially disposed about the drain tube 36 shown in FIGS. 3 and 4, inserted through the openings 58, and then secured to the flange 60, for example, by using stop sleeves or crimps 62.

Figure 8:
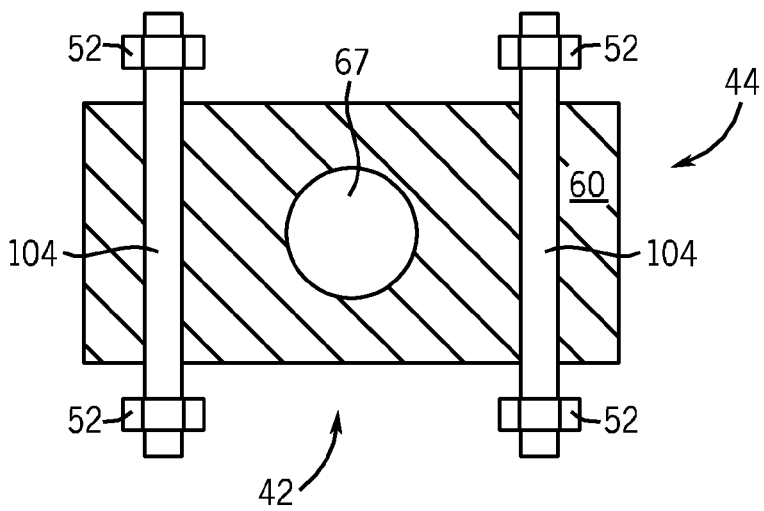
FIG. 8 is a top view illustrating another embodiment of a flange taken along line 7-7 of FIG. 4.

In another embodiment, such as the embodiment shown in FIG. 8, the mounts 52 may be secured by using, for example, multiple rods 104. Indeed, FIG. 8 illustrates a bottom view of an embodiment of the flange 60 having multiple rods 104 suitable for securing the mounts 52. In the illustrated embodiment, the rods 104 may be fastened to the flange 60, for example, by welding the rods 104 to the flange 60. The mounts 52 may be fastened to the rods 104, for example, by tying the mounts 52 to the rods 104. Tying the mounts 52 to the rods 104 may enable a secure and fast attachment of the plug removal shield 44 to the drain tube 36 shown in FIGS. 3 and 4. Likewise, untying the mounts 52 from the rods 104 may enable a simpler and faster method of detaching the plug removal shield 44.

Figure 9:
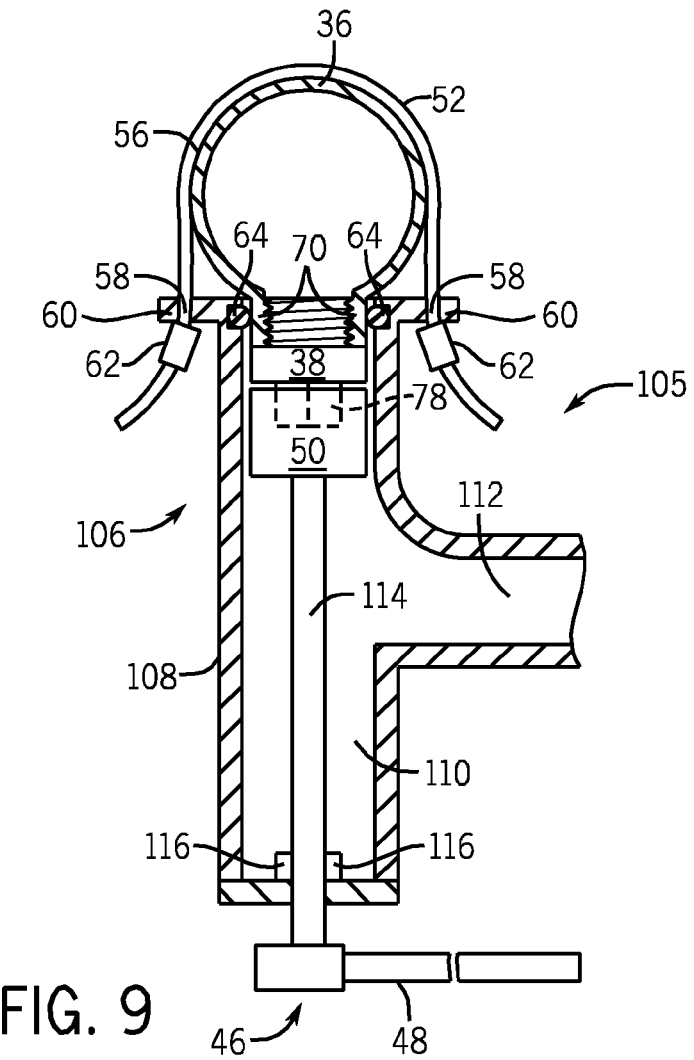
FIG. 9 is a schematic cross-section side view illustrating an embodiment of a drain plug removal kit.

FIG. 9 illustrates a cross-sectional side view of an embodiment of a drain plug kit 105, including a drain plug removal shield 106 incorporating a T-junction tube 108. Indeed, plug removal shields, such as shields 44 shown in FIGS. 3 and 4 and 106, may be provided with different tube embodiments designed to operate in a variety of drain applications. In the depicted embodiment, the T-junction tube 108 may include a chamber 110 useful in capturing the drain plug 38 if the drain plug 38 disengages from the magnetic socket 50. The shield tube 108 embodiment also includes a curved portion 112 suitable for directing fluid draining from the drain tube 36. As mentioned above, the mount 52 may disposed circumferentially on outside surfaces 56 of the drain tube 36. The mount 52 may then be inserted through the openings 58 on the flange 60 of the plug removal shield 106. Fasteners 62, such as closed sleeves or crimps may then be used to securely fasten the plug removal shield 106 to the drain tube 36. That is, the plug removal shield 106 may be securely mounted and coupled to the drain tube 36, so that the seal 64 sealingly contacts the grooved protrusion 70 of the drain tube 36, thus minimizing or eliminating drainage leaks.

In the depicted embodiment, the plug removal tool 46 may include an extension 114 having the socket 50. The extension 114 and the socket 50 may be pre-positioned or pre-disposed inside of the shield tube 108. Pre-positioning the extension 114 and the socket 50 inside the shield tube 108 may enable a faster engagement of the socket 50 to the hexagonal head 78 of the drain plug 38. Accordingly, an annular seal 116 may be positioned circumferentially around the extension 114 of the plug removal tool 46, suitable for sealing or blocking fluid flowing through the chamber 110. Indeed, the use of the annular seal 116 may substantially block or eliminate leaks through the bottom of the chamber 110. The plug removal tool 46 may then be actuated in order to remove the drain plug 38. For example, the operator may drive the wrench 48 to unscrew or otherwise disengage the drain plug 38 from the drain tube 36. The removal of the drain plug 38 may then enable fluid drainage through the tube portion 112. As mentioned above, the tube portion 112 may be fluidly connected to the hose 84 shown in FIGS. 3 and 4. Accordingly, the draining fluid may be directed through the hose 84, for example, into a suitable containment vessel or discard conduit.

Technical effects of the invention include a plug removal kit suitable for removing a drain plug from a drain tube. The drain tube may include a column of water having high pressures. The plug removal kit may include a plug removal shield and a plug removal tool. The plug removal shield may be mounted onto the drain tube, including mountings on locations that may be harder to access. The plug removal tool may then be inserted in the plug removal shield, and used to unfasten the drain plug. The plug removal shield may minimize or eliminate fluid drain leaks. Accordingly, high pressure fluids and fluids that may include hazardous substances may be safely drained.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a plug removal kit comprising a plug removal shield and a plug removal tool;
the plug removal shield, comprising:
a tube configured to surround a plug retaining a fluid volume; and
a mount configured to hold the tube relative to the plug, wherein the tube comprises a port configured to pass the plug removal tool into proximity with the plug, wherein the plug removal tool comprises a socket and a ratchet wrench.

2. The system of claim 1, wherein the port comprises a substrate having a tool opening.

3. The system of claim 2, wherein the tool opening comprises a slot configured to at least substantially seal around a shaft of the plug removal tool.

4. The system of claim 1, wherein the port comprises a grommet configured to seal about the shaft of the plug removal tool.

5. The system of claim 1, wherein the tube comprises a viewing window.

6. The system of claim 1, wherein the tube comprises a transparent or translucent tube.

7. The system of claim 1, comprising a flexible hose coupled to the tube.

8. The system of claim 1, wherein the mount comprise at least one flexible strap.

9. The system of claim 1, comprising a heat exchanger having a fluid conduit having the plug, and wherein the plug removal shield is configured to mount to the fluid conduit for removal of the plug.

10. The system of claim 1, comprising a syngas cooler, a gasifier system, or a combination thereof, having a fluid conduit having the plug, and wherein the plug removal shield is configured to mount to the fluid conduit for removal of the plug.

11. A system, comprising:
a plug removal kit, comprising:
a plug removal shield comprising a tube configured to surround a plug coupled to a fluid-based system, wherein the tube comprises a tool port; and
a plug removal tool configured to remove the plug retaining a fluid volume,
wherein the plug removal shield is configured to shield an operator of the plug removal tool from fluid drainage after removal of the plug by the plug removal tool, and wherein the plug removal tool comprises a shaft extending through the tool port in the tube, a handle disposed external to the tube, and a head disposed inside the tube.

12. The system of claim 11, comprising a fluid-based system having a fluid conduit having the plug, and wherein the plug removal shield is configured to mount to the fluid conduit for removal of the plug.

13. The system of claim 12, wherein the fluid-based system comprises a syngas cooler, a gasifier system, or a combination thereof.

14. A system, comprising:
a fitting removal kit, comprising:
a fitting removal shield comprising a tube configured to surround a threaded fitting coupled to a fluid-based system, wherein the tube comprises a tool port; and
a fitting removal tool comprising a shaft extending through the tool port in the tube, a handle disposed external to the tube, and a head disposed inside the tube.

15. The system of claim 14, wherein the tube comprises a viewing window made of a transparent or translucent material.

16. The system of claim 14, wherein the tool port comprises a resilient wall with an opening disposed about the shaft.

* * * * *